H. L. HAGAN.
LOCKING DEVICE FOR SUIT CASES OR RECEPTACLES.
APPLICATION FILED AUG. 3, 1912.
1,057,145.
Patented Mar. 25, 1913.
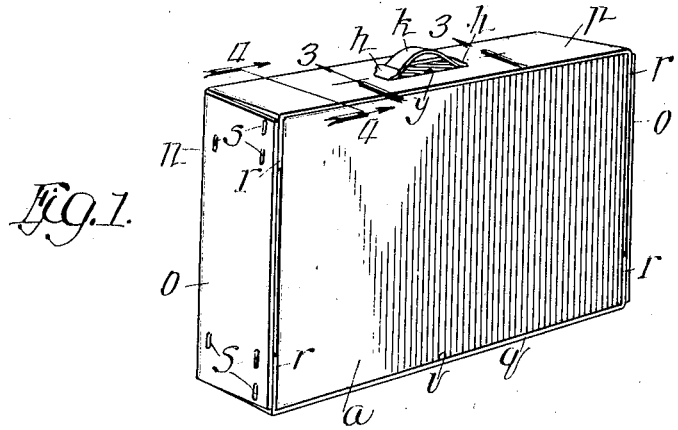
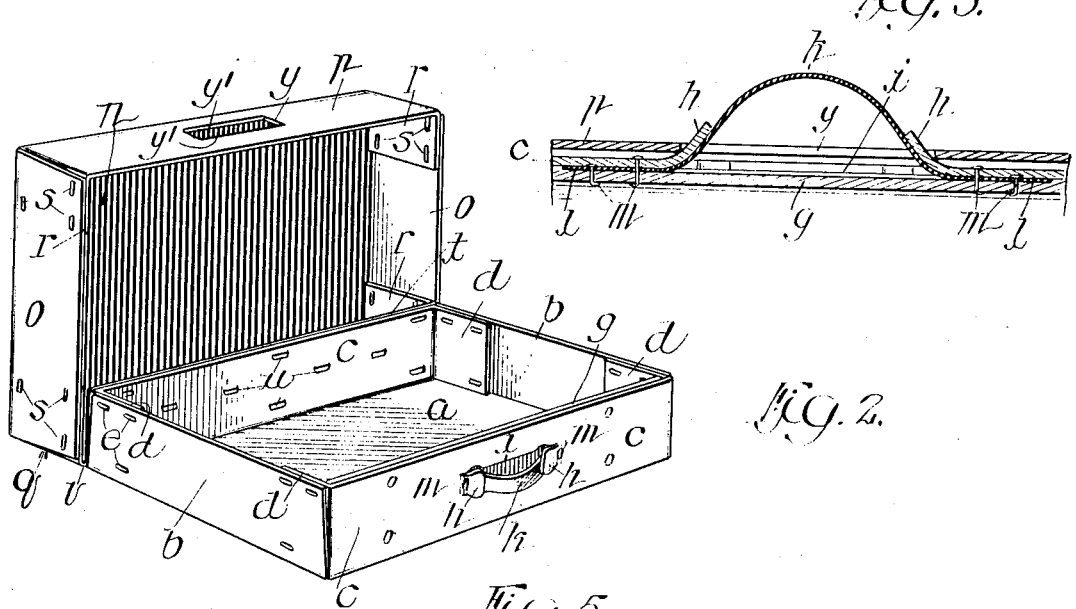
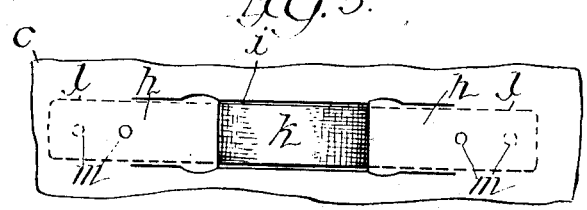
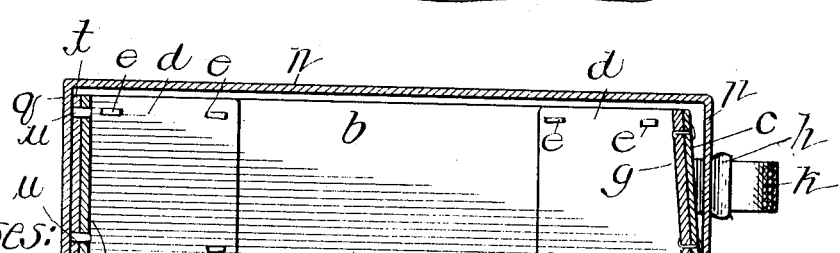
Inventor
Herschel L. Hagan
by Poole & Cromer, Attys
Witnesses:
T. H. Alfred
Eugene C. Wann

UNITED STATES PATENT OFFICE.

HERSCHELL L. HAGAN, OF CHICAGO, ILLINOIS, ASSIGNOR TO CHICAGO CARTON COMPANY, OF CHICAGO, ILLINOIS, A CORPORATION OF ILLINOIS.

LOCKING DEVICE FOR SUIT-CASES OR RECEPTACLES.

1,057,145.  Specification of Letters Patent.  Patented Mar. 25, 1913.

Application filed August 3, 1912. Serial No. 713,088.

*To all whom it may concern:*

Be it known that I, HERSCHELL L. HAGAN, a citizen of the United States, and a resident of Chicago, in the county of Cook and State of Illinois, have invented certain new and useful Improvements in Locking Devices for Suit-Cases or Receptacles; and I do hereby declare that the following is a full, clear, and exact description thereof, reference being had to the accompanying drawings, and to the letters of reference marked thereon, which form a part of this specification.

This invention relates to that class of suit-cases or receptacles having a body member and cover member flexibly connected and having a handle secured to the body member and locking tongues on the body member and movable into position to extend through an opening in the lid or cover member for securing the body and cover members in closed position.

The principal object of the invention is to provide a simple, economical and efficient locking device for suit-cases or receptacles.

A further object of the invention is to provide a suit-case or receptacle formed preferably of fiber board or similar comparatively inexpensive material, and comprising a body member and a cover member, each, by preference, formed in one integral piece and flexibly connected and provided with means for securing or locking the cover member and body member together or in closed position without the use of separate locking means or any locking means other than that formed by integral parts of the casing or receptacle or the handle for supporting the receptacle.

A further object is to provide a locking device for suit-cases or receptacles adapted to be bent into and held in securing or locking position by means of a handle for supporting the receptacle, and formed of integral parts of the body of the receptacle adapted to engage the cover member of the receptacle and hold the cover and body in closed position.

Other and further objects of this invention will appear from an examination of the following description and claims, and from an inspection of the accompanying drawings which are made a part hereof.

The invention consists in the features, combinations and details of construction herein described and claimed.

In the accompanying drawings, Figure 1 is perspective view of a suit-case or receptacle constructed in accordance with my improvements, showing the body member and cover or lid member in closed position, and with the handle extended through an aperture in the cover member and adapted to secure said members in closed position; Fig. 2, a perspective view of the suit-case or receptacle shown in Fig. 1, showing the same in open position, and showing the means for flexibly connecting the body member and cover member; Fig. 3, an enlarged detail view in section, taken on line 3 of Fig. 1 looking in the direction of the arrow, and showing the securing or locking members or tongues and the handle extending through the aperture in the cover member; Fig. 4, an enlarged view in transverse section, taken on line 4 of Fig. 1 looking in the direction of the arrow; and Fig. 5, a detail view of the handle and securing or locking tongues, and a portion of the side frame of the body member, to which the handle is secured.

In constructing a suit-case or receptacle provided with a locking device, constructed in accordance with my invention and improvements, I provide a body member which is, by preference, formed of one integral piece of fiber board or other suitable material, and comprises a bottom portion $a$, end walls $b$ and side walls $c$. Each side wall is provided with an inner end portion $d$ at each of its opposite ends, integral with and extending at right angles to the main side wall portions, and located on the inner side of the corresponding adjacent end wall $b$, and secured to the latter by means of eyelets or staples $e$ or other suitable securing means.

An inner reinforcing side wall member $g$, made preferably of relatively strong material such as wood, is mounted on the inside of one of the side walls $c$ of the body member—see Figs. 2, 3 and 4—and extends preferably the entire length of the body of the receptacle, and said last mentioned side wall $c$ is provided with preferably integral securing members or locking tongues $h$ formed by cutting away a portion of the side wall member $c$ so as to form an aperture $i$.

Through this aperture extends a handle $k$, made preferably of flexible material, and secured to the body member of the receptacle. The handle is secured to said body member by having its opposite ends $l$ inserted between the reinforcing member $g$ and said perforated side wall portion $c$, as shown in Fig. 3, and firmly secured to said members or portions $g$ and $c$ by means of staples or rivets $m$, or other similar or suitable securing means (see Fig. 3), the locking tongues $h$ each having lateral projections which are adapted to project laterally of the aperture $y$ and beyond the opposite edges $y'$ of the latter, as shown in Fig. 5, so as to hold the securing lugs or tongues in locking position. The locking tongues are adapted to lie normally flat within the aperture $i$, shown in Fig. 3, when the handle $k$ is in collapsed or folded position or not in use, and to be raised to position shown in Fig. 3 by the operation of raising the handle or of lifting the receptacle by means of the handle so that the tongues are automatically bent outward to the position shown in Fig. 3, in which position they are adapted to securely hold the cover and body members of the receptacle closed. Thus it will be readily seen, that in order to enable the receptacle to be opened it is only necessary to bend the securing tongues downward to flat position, or into the aperture $i$ in the side wall $c$ of the body member, and to press the handle downward through the aperture $y$ in the side wall of the cover member, or withdraw said handle from engagement with the said aperture. The securing tongues $h$ also serve as shields when the handle is in raised position, and are adapted to not only strengthen the handle, but to prevent the tearing or breaking away of the end wall portion of the aperture $y$ when the handle is required to support the weight of the receptacle and its contents.

The cover member comprises in its construction a top wall portion $n$, end wall portions $o$ and side wall portions $p$ and $q$, all formed preferably in one integral piece and with the side wall portion $q$ and end wall portions $o$ all folded in position to extend preferably in perpendicular relation to the main or top wall portion $n$ of the cover member the side wall portions and end wall portions being disposed at right angles with relation to each other. The side wall $p$ may be slightly inclined downward and outward from its folding line or base, and is, by preference, of such dimensions that its marginal edge $p$ extends to the base of the incased side wall $c$ of the body member, and is provided with an aperture $y$ in position to admit the flexible or flexibly connected handle $k$. The handle $k$ and the locking tongues thus, together, serve as a means for lifting the case or receptacle and as a means for securing the body and cover members in closed position. The side walls $p$ and $q$ of the cover member are each provided at opposite ends thereof with inner angular end portions $r$ folded inward at right angles or in perpendicular relation to said main side wall portions $p$ and $q$ and on the inside of the corresponding adjacent end wall portions $o$, to which said end portions $r$ are secured by means of suitable eyelets or staples $s$, or by other suitable or similar securing means. The entire cover member, including top, side and end walls, is thus formed, by preference, in one integral piece, as already suggested, and the side wall portion $q$ is provided with an integral extension or flap $t$ which is flexible at its base $v$ and of dimensions which, by preference, correspond substantially with the dimensions of the side wall portion $c$ of the body member of the receptacle, to which said flap or extension $t$ is secured by means of eyelets or staples $u$, or other similar or suitable securing means, as shown in Figs. 2 and 3. The top member and main body member of the receptacle are thus flexibly connected in such a manner that the top may be readily swung to opened or closed position, and the aperture $y$ in the side wall $p$ of the top member is in such position with relation to the handle $k$ that said handle extends through said aperture, as indicated in Fig. 1, when the receptacle is closed and serves to secure the top and main body members of the receptacle in closed position. The aperture $i$ in the side wall portion $c$ of the body member is adapted to enable the flexible handle $k$ to be folded in position to occupy the space formed by said aperture, as already suggested, so that the handle forms little or no obstruction to the closing of the receptacle. The handle and locking tongues thus serve as a means for securing the top and body members of the receptacle in closed position without the use of any securing means separate from or additional to the elements which together form the complete suit-case or receptacle, or which are essential parts thereof.

The side wall $c$ of the body member, to which the handle is secured, is, by preference, disposed at an upward and inward incline or inclined inward at the top, as indicated in Fig. 4, and the corresponding side wall $p$ of the cover member may extend downward and outward at a slight incline from the base or line of fold, if desired, as indicated in Fig. 2, so as to enable the cover to be readily opened and closed, when flexibly connected with the body member in the manner described.

By the above construction and arrangement of parts, the top and body members of the receptacle are so flexibly secured together as to enable the receptacle to be readily opened and closed, without the use of hinges or other flexible connecting means additional to said body and cover members, and said body and cover members are adapted to be secured in closed position in such a manner as to enable the receptacle to be opened with facility and without the use of any additional securing means, and in such a manner as to enable securing means separate from or additional to the otherwise essential parts of the receptacle to be dispensed with. The side wall to which the handle is secured is reinforced by the inner member $g$, which is of sufficient strength to sustain the strains to which it is subjected when the case or receptacle is supported by the handle.

I claim:

1. A receptacle comprising in its construction a body member having side walls and end walls, a cover member flexibly connected with the body member and comprising in its construction a side wall provided with an aperture, flexible locking tongues integral with a side wall portion of the body member and adapted to extend through said aperture and in locking engagement with the cover member when the body and cover members are in closed position, and a flexible handle in engagement with the locking tongues and adapted to bend the latter outward into position to extend through said aperture and in locking engagement with the cover member.

2. A suit-case comprising in its construction a body member having side walls and end walls, a cover member flexibly connected with the body member and comprising in its construction a side wall provided with an aperture, one of the side walls of the body member being provided with integral locking tongues adapted to project through said aperture when the body and cover members are in closed position, and a handle flexibly secured to the body member and adapted to extend through said aperture when the cover and body members of the receptacle are in closed position.

3. A receptacle comprising in its construction a body member having side walls and end walls, a cover member flexibly connected with the body member and comprising in its construction a side wall provided with an aperture, flexible locking tongues integral with a side wall portion of the body member and adapted to extend through said aperture and in locking engagement with the cover member when the body and cover members are in closed position, each of said tongues having lateral projections adapted to project beyond the adjacent edges of said aperture, and a flexible handle located between and in engagement with the locking tongues and adapted to bend the latter outward into position to extend through said aperture in the cover member and into locking engagement with the latter.

4. A receptacle comprising in its construction a body member having side walls and end walls, a cover member flexibly connected with the body member and comprising in its construction a side wall provided with an aperture, flexible locking tongues integral with a side wall portion of the body member and adapted to extend through said aperture and in locking engagement with the cover member when the body and cover members are in closed position, an inner reinforcing member secured to the side wall portion on which said locking tongues are located, and a flexible handle extending between the locking tongues and said reinforcing member and in engagement with the inner sides of the locking tongues and adapted to support said tongues in locking engagement with the cover member.

5. A suit case comprising in its construction a body member having side walls and end walls, a cover member having side walls and end walls and flexibly connected with said body member, one of the walls of said cover member being provided with an aperture, locking tongues flexibly connected with one of the walls of the body member and adapted to project through said aperture when said body and cover members are in closed position, and a handle in engagement with said locking tongues.

In testimony, that I claim the foregoing as my invention I affix my signature in the presence of two witnesses, this 26th day of June A. D. 1912.

HERSCHELL L. HAGAN.

Witnesses:
CHARLES H. POOLE,
EUGENE C. WANN.